United States Patent Office 3,592,862
Patented July 13, 1971

3,592,862
SELECTIVE HYDROGENATION OF DIENES
Darryl R. Fahey, Bartlesville, Okla., assignor to
Phillips Petroleum Company
No Drawing. Filed Apr. 13, 1970, Ser. No. 28,072
Int. Cl. C07c 5/14, 5/16
U.S. Cl. 260—666    14 Claims

ABSTRACT OF THE DISCLOSURE

The hydrogenation of cyclic and acyclic dienes to monoenes is improved by promoting trihydrocarbylphosphine modified carbonyl cobalt catalysts with alcohols, ethers, and amides.

---

This invention relates to methods to promote the selective hydrogenation of dienes to monoenes. The invention further relates to methods to improve trihydrocarbylphosphine modified carbonyl cobalt catalysts.

Cyclic dienes are prepared primarily by condensation reactions of aliphatic dienes, such as the condensation of butadiene to cyclooctadiene. The cyclic dienes subsequently can be hydrogenated to the monoene, and thereafter oxidatively cleaved to form a paraffinic dicarboxylic acid, for example cyclooctene to suberic acid. Such saturated dicarboxylic acids are important starting materials for the production of fibers, molding resins, synthetic lubricants, and plasticizers.

Acyclic dienes can be selectively hydrogenated to monoenes, then converted to one or more of a variety of useful end products, the choice being somewhat conditioned by the particular olefin, e.g. to alcohols, ethers, carboxylic acids, glycols, carbonyl compounds, epoxides, peroxides, halides, nitriles, organometallic, oligomers, polymers, and the like.

Trihydrocarbylphophine modified carbonyl cobalt catalysts are known to catalyze hydrogenation reactions. However, the use of such catalysts has not been commercially feasible due to poor yields, rapid catalyst decomposition, or because of undesirable side reactions.

I have discovered that trihydrocarbylphosphine modified carbonyl cobalt catalysts can be effective promoted and so rendered highly effective and useful. The promoters I use are alcohols, ethers, and amides. My discovery results in promoted catalysts effective in general in producing high yields of the monoene, with minimal side reactions, in relatively short reaction times.

It is an object of my invention to provide an improved process for the selective hydrogenation of cyclic and acyclic dienes to the corresponding cyclic and acyclic monoenes.

It is a further object of my invention to provide improved promoted catalysts for these selective hydrogenation processes.

The process with which I am concerned utilizes any cyclic diolefin which is either a conjugated diolefin, or is capable of rearranging to a conjugated structure. The nonconjugated cyclic diolefins are suitable, since I have found that they tend to rearrange progressively to a conjugated structure in the process of my reaction and with my promoted catalysts. For example, 1,5-cyclooctadiene rearranges progressively through 1,4-cyclooctadiene to 1,3-cyclooctadiene. These cyclic dienes include such as cyclopentadiene, cyclohexadiene, cyclododecadiene, cyclopentadecadiene, and the like, of up to 70 carbon atoms in the cyclic structure.

My promoted catalysts are effective, as well, in the process of hydrogenation of acyclic diolefins having up to 20 carbon atoms in the chain. Acyclic dienes useful in the process of my invention and with my catalysts can include such as 1,3-heptadiene, 1,5-nonadiene, 2,6,10,14-tetramethylhexadecadiene, and the like.

The dienes, cyclic and acyclic, can be substituted with any substituent that will not interreact with the catalysts, the reaction diluent, the paraffinic diluent for the promoter, or the products of reaction. Substituents can include alkyl or aryl groups.

The catalysts which I use in my reactions, and which I promote according to the process of my reaction, are trihydrocarbylphosphine carbonyl cobalt catalysts:

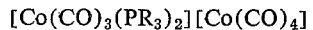

$$[Co(CO)_3(PR_3)_2][Co(CO)_4]$$

Within the above trihydrocarbylphosphine modified carbonyl cobalt catalysts, R can be alkyl of up to 6 carbon atoms such an methyl, ethyl, propyl, butyl, and the like, or cycloalkyl such as cyclohexyl of from 5 to 7 carbon atoms, or can be aryl such as phenyl or substituted aryl containing up to three substituents of up to 3 carbon atoms per substituent. A presently preferred catalyst is tricarbonylbis(tributylphosphine)cobalt(I) tetracarbonylcobaltate(−I). A synthesis of the preferred catalyst is shown in one of the examples given hereinafter.

The amount of catalyst employed, the trihydrocarbylphosphine modified carbonyl cobalt, usually is based on the amount of diene to be hydrogenated. A weight ratio of catalyst to diene of 0.008 to 1, preferably 0.025 to 0.08, is useful. There actually appears no particular upper limit in the amount of catalyst used except on a basis of cost.

The promoters that I use are selected from alcohols, ethers, and amides. The useful alcohols within the context of my promoters are those containing from 1 to 8 carbon atoms, are saturated, and preferably primary. The ethers which are useful in the context of my promoters are the dialkyl ethers wherein the alkyl group corresponds to those described for the alcohols above. Combination alcohol-ethers also are quite suitable within my invention, such as 2-methoxy-ethanol.

Amides, more particularly N,N-disubstituted aliphatic amides are useful promoters for these catalysts and reactions. The substituents on the nitrogen can be any alkyl group ranging from 1 to 8 carbon atoms per substituent. The amide itself can be formamide, acetamide, or other aliphatic amide grouping, including branched as well as straight-chain, of up to 8 carbon atoms. A promoter to catalyst weight ratio is used broadly of from 0.06 to 40, preferably of from 0.6 to 20.

The following examples illustrate the effectiveness and the versatility of the promoters of my invention. The examples should not be considered limitative of either the promoters or the process of my invention.

EXAMPLE I

In preparation of the catalyst, 3.42 g. (gram) (0.01 mole) of dicobalt octacarbonyl, 50 ml. (milliliters) of anhydrous diethyl ether, and 4.04 g. (0.02 mole) of tributyl phosphine, were charged in that order to a 3 ounce reactor with air excluded. The mixture was stirred, normally 1 to 2 hours being sufficient, at a few millimeters pressure reduction less than atmospheric in order to avoid carbon monoxide buildup. The crystalline product which formed was collected, washed with diethyl ether, and dried on a sintered glass filter with a minimum of atmospheric exposure. The yield of catalyst obtained was 6.57 g. or approximately 91.6 percent of theoretical. The catalyst obtained was tricarbonylbis(tributylphosphine)cobalt(I) tetractrbonylcobaltate(−I) with a melting point of 114 to 115° C., showing high purity.

In a selective hydrogenation reaction employing my catalyst, a 3 ounce aerosol compatibility tube containing a Teflon covered magnetic stirring bar was charged with 0.12 g. (0.17 mmole) of the trihydrocarbylphosphine modified carbonyl cobalt catalyst described above together with 2.11 g. (18.6 mmole) of 1,5-cyclooctadiene, 2.0 ml. of 1-butanol, and 30 ml. of cyclohexane. For the control run the same ingredients and same components were used except omitting the 1-butanol promoter. After adding the ingredients, the reaction tube was sealed quickly, degassed under vacuum, and pressurized to approximately 180 p.s.i.g. using hydrogen. The tube was immersed in an oil bath, and the temperature of the bath was increased to the range of from 145 to 155° C. over approximately a 150 minute interval. The reaction mixture was magnetically stirred at a rapid rate at all times during the reaction period. Hydrogen adsorption began at a temperature of about 135° C. Additional hydrogen was introduced into the reaction vessel to maintain a pressure between about 200 and 210 p.s.i.g. When the hydrogen uptake had ceased, the reaction was stopped.

The crude reaction mixture was analyzed by gas-liquid partition chromatography. The results of the comparative runs with and without my promoter are shown in the following table.

TABLE I

| Run | | Unreacted, wt. percent | Cyclooctene, wt. percent | Cyclooctane wt. percent |
|---|---|---|---|---|
| 1 | Control | 45.6 | 50.5 | 3.9 |
| 2 | With 1-butanol promoter | 0 | 92.2 | 7.7 |

The comparative runs above show dramatically an 85 percent increase in formation of cyclooctene by the use of the catalysts with my promoter as opposed to no promoter, and furthermore show that essentially all of the starting material had reacted.

EXAMPLE II

In the runs of this example, 0.12 g. (0.17 mmole) of the tricarbonyl-bis(tributylphosphine)cobalt(I) tetracarbonylcobaltate(−I) catalyst, 2.11 g. (0.0195 mole) of 1,5-cyclooctadiene, and 30.0 ml. of cyclohexane diluent, were used. The reaction temperature was maintained between 145 and 155° C. Sufficient hydrogen was used to maintain a reaction pressure of from 165 to 210 p.s.i.g. Otherwise conditions were used similar to those described in Example I above.

In each run, a different promoter was used, otherwise identical runs were made as to the reactants, catalyst, and amounts thereof. The results are shown in Table II below.

TABLE II

| Run No. | Promotor and amount | Product analysis, wt. percent | | |
|---|---|---|---|---|
| | | Cyclooctadiene | Cyclooctene | Cyclooctane |
| 3 | 2-methoxyethanol, 1.9 g | 0 | 88.7 | 11.2 |
| 4 | bis(2-methoxyethyl) ether, 1.9 g | 0 | 91.8 | 8.1 |
| 5 | Tetrahydrofuran, 2.2 g | 0 | 92.0 | 8.0 |
| 6 | Dimethylsulfoxide, 2.2 g | 86.2 | 13.9 | 0 |
| 7 | N,N-dimethylformamide, 2.4 g | 19.2 | 72.6 | 8.2 |

The above results show that alcohols other than the 1-butanol used in Example I are effective, i.e., 2-methoxyethanol in Run 3. Also that ethers as in Runs 3 and 4 are effective. The amides, such as the N,N-disubstituted amide in Run 7, are effective. The cyclic ethers, as in Run 5, also are effective. However, the disubstituted sulfoxide of Run 6 is not effective as a promoter.

EXAMPLE III

A wide range of other alcohol promoters can be used in my invention. The following table shows the results of using various promoters, each an alcohol, under reaction conditions exactly as described in Example II above.

TABLE III

| Run No. | Promoter | Product analysis, wt. percent | | |
|---|---|---|---|---|
| | | Cyclooctadiene | Cyclooctene | Cyclooctane |
| 8 | Methanol | 0.8 | 90.0 | 9.1 |
| 9 | Ethanol | 15.6 | 75.2 | 9.2 |
| 10 | 1-butanol | | 92.0 | 8.0 |
| 11 | Ethylene glycol | 60.6 | 38.0 | 1.3 |

Run 11 using ethylene glycol demonstrates that a glycol is not useful.

EXAMPLE IV

A further series of runs were made employing 0.12 g. (0.17 mmole) of the catalyst, 2.11 g. (0.0195 mole) of 1,5-cyclooctadiene, 30.0 ml. of cyclohexane diluent, otherwise following the procedure as described in Example I hereinabove. In each of the runs in this example, 1-butanol was used as the promoter, however, the amount of 1-butanol was varied. The results are shown in Table IV below:

TABLE IV

| Run No. | 1-butanol, molarity in cyclohexane | Product analysis, wt. percent | | |
|---|---|---|---|---|
| | | Cyclooctadiene | Cyclooctene | Cyclooctane |
| 12 | 0.034 | 0 | 83.3 | 16.5 |
| 13 | 0.17 | 0 | 91.7 | 8.3 |
| 14 | 0.33 | 0 | 86.4 | 13.4 |
| 15 | 0.62 | 0 | 87.7 | 12.2 |
| 16 | (¹) | 20.2 | 66.4 | 13.4 |

¹ 30 ml. 1-butanol used without the cyclohexane diluent.

The above data indicate a 1-butanol molarity of approximately 0.17 in the diluent is optimum. However, the promotional effect of 1-butanol is strongly evident over a concentration range as broad as 0.034 to 0.62 molar. Additionally, the data indicate that, in the absence of a diluent, both the conversion of cyclooctadiene and the selectivity to cyclooctene are impaired.

As I have expressed above, and particularly as shown by comparing Run 16 with previous runs, a paraffinic diluent results in improved results over runs with the catalyst promoted with materials as I have discussed, but without diluent.

My promoters can be used in a broad concentration of between 0.0005 and 5 molarity of the promoter in the diluent used. I prefer a range of about 0.01 to about 1 molar as giving effective results.

The diluent, where used, can include such as the paraffin hydrocarbons, both cyclic and acyclic, such as n-pentane, n-hexane, cyclooctane, isodecane, and similar diluents of up to about 12 carbon atoms per molecule. The amount of diluent is adjusted according to the amount of diene to be hydrogenated, and ranges from a diluent to diene ratio of from 1:1000 to 1:5, though a ratio of about 1:50 is preferred. Too little diluent appears to shorten catalyst life, and large quantities of diluent are undesirable in terms of materials handling.

Reaction conditions include the use of hydrogen, of course, together with a reaction pressure in the range of from about 1 to as much as 700 p.s.i.g., though preferably 100 to about 250 p.s.i.g. As hydrogen pressure is elevated, reaction rates increase, however the selectivity toward the monoene appears to decrease. The hydrogen used can be diluted with inert gas, such as a low molecular weight paraffin, introgen, or a rare gas, if desired, since dilution of the hydrogen tends to slow the reaction and thus is useful as a means of moderating rate of reaction.

Reaction temperatures can range from 125° C. to as much as 180° C., though a moderate range of between 135 and 155° C. is more commonly employed. The catalysts are temperature sensitive and tend to decompose above about 180° C. Reaction time ranges from a minute to as much as 24 hours, more usually from 1 to 3 hours. In practice, reaction conditions are maintained until hydrogen uptake ceases or substantially ceases. The catalysts tend to be sensitive to both oxygen and moisture. Therefore, the selective hydrogenation preferably is carried out with the exclusion of oxygen and moisture.

In my examples and discussion I have shown the effectiveness of a variety of promoters for trihydrocarbylphosphine modified carbonyl cobalt catalysts. Variations are possible within the scope of my invention, yet without departing from the true scope and spirit thereof.

I claim:

1. An improved method for the selective hydrogenation of a cyclic diene to a cyclic monoene using trihydrocarbylphosphine modified carbonyl cobalt catalyst wherein the improvement comprises the use of a promoter selected from the group consisting of alcohols, ethers, amides and combinations thereof.

2. The method according to claim 1 wherein said cyclic diene contains up to 20 carbon atoms in the cyclic structure thereof.

3. The method according to claim 2 wherein said catalyst is represented by $$[Co(CO)_3(PR_3)_2][Co(CO)_4]$$

wherein R is selected from alkyl of up to 6 carbon atoms, cycloalkyl of up to 7 carbon atoms, and aryl; and said R has from 0 to 3 alkyl substituents of up to 3 carbon atoms per substituent.

4. The method according to claim 3 wherein said alcohol contains from 1 to 8 carbon atoms; said ether contains alkyl groups of from 1 to 8 carbon atoms per alkyl group; said amides contain, on the N thereof, two substituents which are alkyl groups of from 1 to 8 carbon atoms per group and said amide itself can contain up to 8 carbons other than in the alkyl groups thereof; and combination thereof.

5. The method according to claim 4 wherein a catalyst to diene weight ratio of from 0.008 to 1 is employed.

6. The method according to claim 5 wherein a promoter to catalyst weight ratio of from 0.06 to 40 is employed.

7. The method according to claim 6 wherein further is used a paraffinic diluent selected from among paraffin hydrocarbons of up to 12 carbon atoms per molecule and mixtures thereof, and said diluent constitutes from 1:1000 to 1:5 weight ratio of said diluent to said diene.

8. The method according to claim 7 wherein the molarity of said promoter in said diluent is from 0.0005 to 5.

9. The method according to claim 7 wherein said hydrogenation is conducted under conditions including a pressure of from 1 to 700 p.s.i.g., a temperature up to 180° C., and a reaction time from 1 minute to 24 hours, and employs hydrogen.

10. The method according to claim 9 wherein said hydrogen is diluted with at least one inert gas.

11. The method according to claim 9 wherein said catalyst is $$[Co(CO)_3(PBu_3)_2][Co(CO)_4]$$

wherein Bu is butyl.

12. The method according to claim 11 wherein said diene is cyclooctadiene and said promoter is a n-butanol.

13. The method according to claim 11 wherein said promoter is selected from the group consisting of alcohols containing up to 4 carbon atoms and ethers containing up to 6 carbon atoms.

14. The method according to claim 11 wherein said promoter is selected from the group consisting of tetrahydrofuran and N,N-dimethylformamide.

References Cited

UNITED STATES PATENTS

| | | | |
|---|---|---|---|
| 3,110,747 | 11/1963 | Mullincaux | 260—666P |
| 2,360,555 | 10/1944 | Evans | 260—666A |
| 3,439,054 | 4/1969 | Kroll | 260—666 |
| 3,022,359 | 2/1962 | Wiese | 260—666A |
| 3,499,050 | 3/1970 | Gosser | 260—666A |

DELBERT E. GANTZ, Primary Examiner

V. O'KEEFE, Assistant Examiner

U.S. Cl. X.R.

252—431N, 431P